United States Patent [19]
Koitabashi

[11] Patent Number: 5,242,040
[45] Date of Patent: Sep. 7, 1993

[54] STRUCTURE OF ROTOR OF ELECTROMAGNETIC CLUTCH

[75] Inventor: Takatoshi Koitabashi, Richardson, Tex.

[73] Assignee: Sanden Corporation, Gunma, Japan

[21] Appl. No.: 848,746

[22] Filed: Mar. 10, 1992

[51] Int. Cl.$^5$ .......................... F16D 27/112
[52] U.S. Cl. .................. 192/84 C; 192/107 R; 335/281
[58] Field of Search ............... 192/84 R, 84 A, 84 B, 192/84 C, 84 T, 107 R; 335/281, 296, 297

[56] References Cited

U.S. PATENT DOCUMENTS

| | | | |
|---|---|---|---|
| 3,036,680 | 5/1962 | Jaeschke | 192/84 C |
| 4,498,066 | 2/1985 | Fujiwara et al. | 335/281 |
| 4,567,975 | 2/1986 | Roll | 192/84 C |
| 4,635,774 | 1/1987 | Sekiguchi et al. | 192/84 C X |

FOREIGN PATENT DOCUMENTS

| | | | |
|---|---|---|---|
| 339431 | 11/1989 | European Pat. Off. | 192/84 C |
| 55-36658 | 3/1980 | Japan | 192/84 C |
| 60-179531 | 9/1985 | Japan | 192/84 C |

*Primary Examiner*—Richard M. Lorence
*Attorney, Agent, or Firm*—Baker & Botts

[57] ABSTRACT

An electromagnetic clutch rotor has an axial end plate with a plurality of concentric rings formed therearound. Each concentric ring is defined by a plurality of alternating arcuate slits and ribs. Arcuate slits form poles on opposite sides thereof, and cause the magnetic flux to follow a zigzagging path between the axial end plate and the armature plate. The ribs on adjacent concentric rings are not aligned radially, and thus reduce the amount of flux leakage through the axial end plate. In addition, the ribs are progressively larger towards the radial center to account for the increased bending stresses towards the center of the axial end plate.

6 Claims, 4 Drawing Sheets

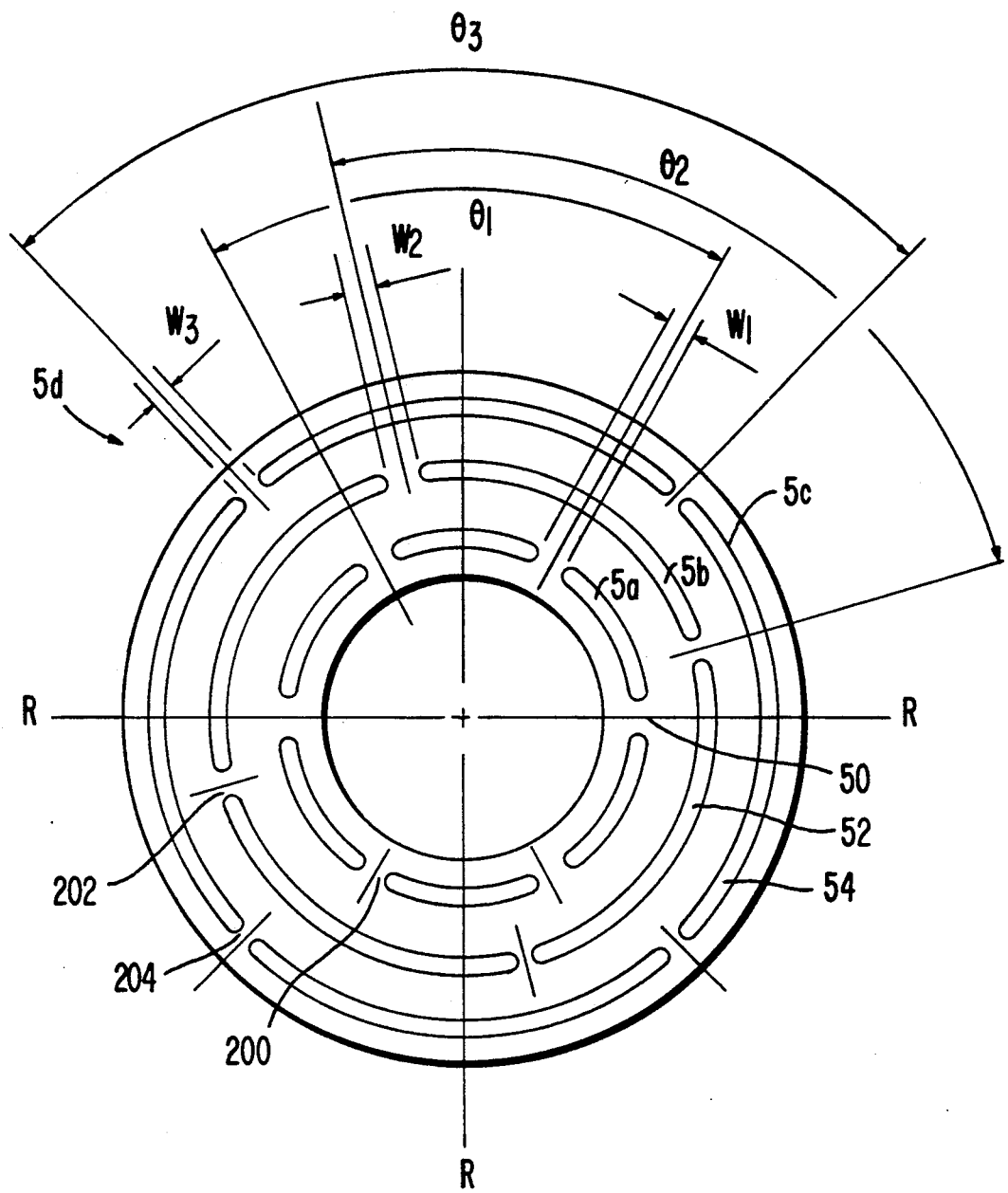

STRUCTURE OF ROTOR OF ELECTROMAGNETIC CLUTCH

BACKGROUND OF THE INVENTION

1. Field of the Invention

The present invention generally relates to an electromagnetic clutch, and in particular, to an improved clutch rotor designed to reduce the amount of electromagnetic flux that leaks through the rotor and to an improved clutch rotor designed to uniformly distribute the driving forces across the radius of the rotor.

2. Description of the Prior Art

Electromagnetic clutches are well known in the prior art and may be used to control the transfer of power from an automobile engine to the refrigerant compressor of an automotive air conditioning system. The general structure of an electromagnetic clutch for an automobile air conditioning compressor is disclosed in U.S. Pat. Nos. 3,044,594 and 3,082,933, both of which are hereby incorporated by reference.

The construction of an electromagnetic clutch is shown in FIG. 1. The clutch assembly is disposed on the outer peripheral portion of annular tubular extension 2, which projects from an end surface of an unshown compressor housing to surround drive shaft 3. The clutch assembly includes rotor 5 rotatably mounted on tubular extension 2 by hearings 6. Rotor 5 is driven by a belt coupled to the automobile engine (not shown). As best seen in FIG. 2, axial end plate 5$d'$ of rotor 5 is provided with a plurality of concentric rings 50', 52', 54', three of which are shown in FIG. 2. Concentric rings 50', 52', 54' are defined by a plurality of alternating arcuate slits 5$a'$, 5$b'$, 5$c'$ and ribs 200', 202', 204'. For example, inner ring 50' is defined by a plurality of alternating arcuate slits 5$a'$ and ribs 200'. Middle ring 52' is defined by a plurality of alternating arcuate slits 5$b'$ and ribs 202'. Outer ring 54' is defined by a plurality of alternating arcuate slits 5$c'$ and ribs 204'. Slits 5$a'$, 5$b'$, 5$c'$ form magnetic poles on axial end plate 5$d'$ of rotor 5.

Axial end plate 5$d'$ of FIG. 2 forms part of six pole clutch. In this configuration, the three concentric rings 50', 52', 54' carry less magnetic flux than the remaining areas of the rotor. One magnetic pole face is defined by the annular area of the disc located radially inwardly of inner ring 50', two poles are defined by the annular area between inner ring 50' and middle ring 52', two additional poles are defined by the annular area between middle ring 52' and outer ring 54', and the sixth pole is defined by the annular area located outwardly of outer ring 54'.

Hub 7 (FIG. 1) is fixed to the outer terminal end of drive shaft 3 extending beyond tubular extension 2. Armature plate 8 is flexibly joined to hub 7 by a plurality of leaf springs 9. Leaf springs 9 are fixed to the outer surface of armature plate 8 by rivets 11. The axial end surface of armature plate 8 faces axial end plate 5$d$ of rotor 5 with a predetermined axial air gap G therebetween. The axial end surface of armature plate 8 is provided with concentric arcuate slits 8$a$, 8$b$ forming pole face 8$c$. Slits 8$a$ are positioned to be opposite the midway point between slits 5$a$, 5$b$ on axial end plate 5$d$ while slits 8$b$ are positioned to be opposite the midway point between slits 5$b$, 5$c$ on axial end plate 5$d$.

Electromagnet 10 is mounted on compressor housing 1 concentric with drive shaft 3. Electromagnet 10 includes electromagnetic coil 101 disposed within annular hollow portion 5$e$ of rotor 5 and is surrounded by an air gap. When coil 101 of electromagnet 10 is energized, pole face 8$c$ is attracted to axial end plate 5$d$. Thus, drive shaft 3 rotates as rotor 5 is turned by the engine. If coil 101 of electromagnet 10 is not energized, pole face 8$c$ of armature plate 8 is separated from axial end plate 5$d$ by the recoil strength of leaf springs 9. Rotor 5 still rotates in response to the engine output, but drive shaft 3 is not turned.

Upon energization of electromagnetic coil 101, magnetic flux M, which is produced around electromagnet 10, passes through a magnetic passageway formed within electromagnet 10, rotor 5 and armature plate 8. Since magnetic flux M tends to follow the shortest path through the magnetic passageway, the flux M passes through rotor 5 and armature plate 8 in a zigzagging manner, as indicated by the dotted line in FIG. 1.

In the prior art axial end plate construction of FIG. 2, however, all of the ribs 200', 202', 204' are aligned along the same radii R'. Additionally, the angle $\theta_1'$ between ribs 200' on inner ring 50' is the same as the angle $\theta_2'$ between ribs 202' on middle ring 52', and the angle $\theta_3'$ between ribs 204' on outer ring 54' is the same as angles $\theta_1'$ and $\theta_2'$. Consequently, some of the electromagnetic flux "leaks" through the radially aligned ribs 200', 202', 204'. The leakage volume of the magnetic flux passing through radially aligned ribs 200', 202', 204' in a conventional electromagnetic clutch can be more than 25% of the entire magnetic flux generated by the electromagnet. As a result, the attractive force between the axial end plate and the armature plate is reduced. To compensate for this flux leakage, the number of coils in the electromagnet must be increased which in turn increases the size of the compressor.

In addition, rotor 5 of FIG. 1 is constructed with a plurality of V-notches for engagement with a plurality of belts. Consequently, a large bending moment due to the additional belts acts on the rotor. This bending moment is in turn transmitted to the ribs 200', 202', 204' as a bending stress represented by the following equations:

| | |
|---|---|
| Bending stress: S = M / Z | (1) |
| Bending moment: M = W * l | (2) |
| Section Modulus: Z = (b * h²) / 6 | (3) | where S is the bending stress, M is the bending moment, W is the load of the belt, l is the length of the rib from the position of load W, Z is the section modulus, b is the width of the rib, and h is the thickness of the frictional surface portion of the rotor.

For example, with reference to FIG. 3, there is shown a free body diagram of a rotor with potential relative radial positions of the ribs. If the load W of the belt is 10 kg, and the length l of the ribs 204', 202', 200' from the position of the load W are 1 cm, 2 cm, and 4 cm, respectively, the bending moment M experienced by rib 204' is 10 kg-cm, rib 202' is 20 kg-cm, and rib 200' is 40 kg-cm. Accordingly, applying the bending moment M to equation (1) above, the bending stress for each of ribs 204', 202', 200' are as follows:

$S_{204'} = 10/Z$ $S_{202'} = 20/Z$ $S_{200'} = 40/Z$

If the section moduli of the ribs are the same (i.e., the widths between the ribs are all equal, $W_1' = W_2' = W_3'$), the largest bending stresses occur at rib 200'. Thus, the ribs, if designed to evenly distribute the bending moment, should be the widest at the radially innermost position. Therefore, rib 200' should be the widest. However, all of the ribs on prior art rotors are virtually identical in size despite their relative radial positioning on the rotor. Consequently, the inner ribs are subject to more fatigue than the outer ribs.

SUMMARY OF THE INVENTION

It is an object of the present invention to provide an electromagnetic clutch that increases its torque transfer by reducing the amount of electromagnetic flux that leaks through the rotor and armature plate.

It is a further object of the present invention to provide an electromagnetic clutch that accounts for the increased bending stresses experienced by the ribs between the slits on the innermost concentric rings.

An electromagnetic clutch according to this invention includes a first rotatable member supported on a bearing. The first rotatable member is connected to an external driving source and has a magnetic axial end plate. The magnetic axial end plate has at least one arcuate slit concentric with the axis of the first rotatable member. A second rotatable member is rotatably supported on a second bearing. An annular magnetic member is supported on the second rotatable member in such a manner to permit limited axial movement and faces the axial end plate of the first rotatable member with a gap therebetween. The annular magnetic member has at least one arcuate slit. An electromagnet is associated with the first rotatable member for attracting the annular magnetic member of the second rotatable member. The axial end plate is designed to have ribs that are progressively wider toward the radial center so that the bending stress is evenly distributed over the radius of the axial end plate. Moreover, none of the ribs of the inner concentric ring are aligned radially with any of the ribs of the middle concentric ring, and none of the ribs of the middle concentric ring are aligned radially with any of the ribs on the outer concentric ring.

More particularly, the preferred embodiment is directed to an improved structure for the axial end plate of the rotor on an electromagnetic clutch. The axial end plate according to the preferred embodiment has three concentric rings: an inner concentric ring, a middle concentric ring, and an outer concentric ring. Each concentric ring is defined by a plurality of alternating arcuate slits and ribs. Arcuate slits form non-conducting air gaps that do not conduct magnetic flux generated by the electromagnet. The arcuate slits force the magnetic flux to zigzag between the axial end plate and the armature plate. This zigzagging increases the attractive force between the axial end plate and the armature plate. Moreover, the axial end plate according to the preferred embodiment reduces the "leakage" flux by radially offsetting the ribs of adjacent concentric rings. This reduces the amount of flux that would otherwise leak radially through the aligned ribs without zigzagging between the armature plate and axial end plate. In addition, the ribs are made progressively wider towards the radial center of the axial end plate, as the bending stress from the belt increases towards the radial center of the axial end plate. Accordingly, the bending stress is more evenly distributed across the radius of the axial end plate.

An axial end plate according to the preferred embodiment is manufactured with the angle between the center of adjacent ribs on the inner concentric ring less than the angle between the center of the ribs on the outer concentric ring. In addition, the angle between the center of the ribs on the middle concentric ring is equal to or less than the angle between the center of the ribs on the outer concentric ring. These relationships further assure that the bending stresses are evenly distributed across the radius of the axial end plate.

Further objects, features and other aspects of this invention will be understood from the following detailed description of the preferred embodiment of this invention with reference to the attached drawings.

BRIEF DESCRIPTION OF THE DRAWINGS

FIG. 4 is an end plan view of a rotor according to the preferred embodiment.

DETAILED DESCRIPTION OF THE PREFERRED EMBODIMENT

Figure 1:
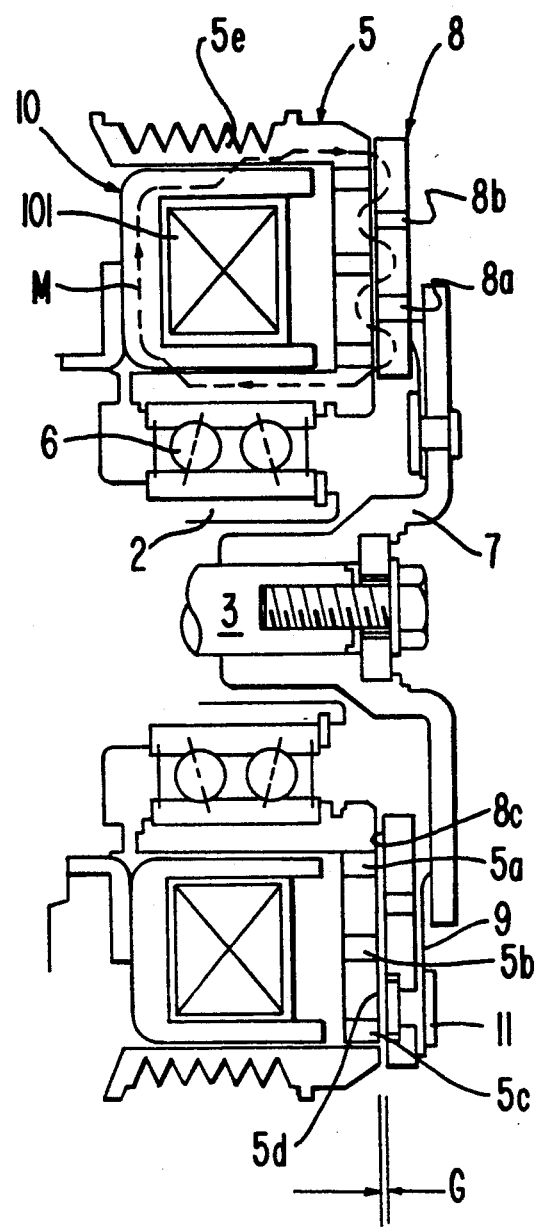
FIG. 1 is a cross-sectional view of a conventional electromagnetic clutch.
Figure 2:
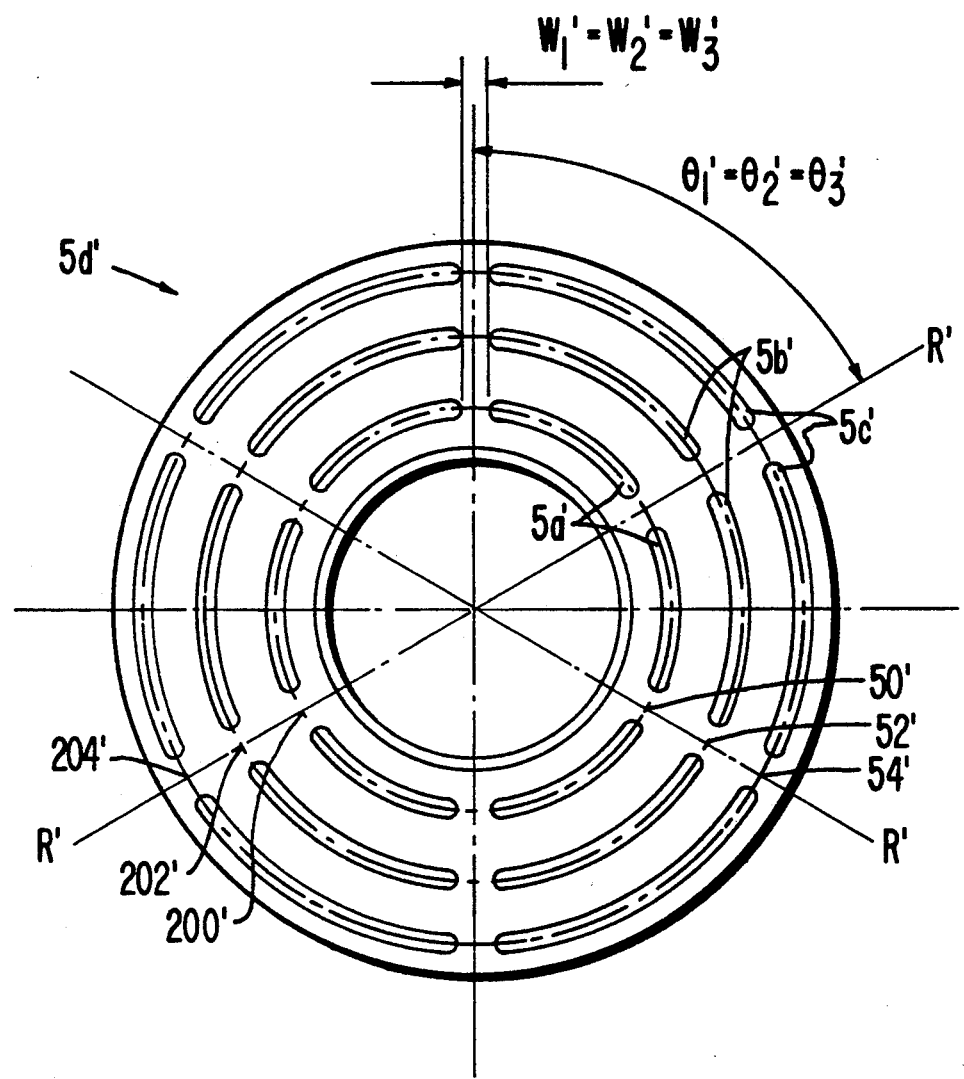
FIG. 2 is an end plan view of a prior art axial end plate on an electromagnetic clutch rotor.
Figure 3:
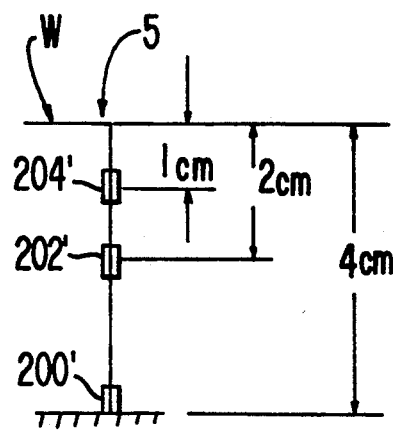
FIG. 3 is a free body diagram of a clutch rotor showing the relative distances between the application of the driving force and the ribs on the rotor.

For convenience, similar elements have been designated by the same reference numerals that have been previously defined, but without the prime (') designation. The construction of an electromagnetic clutch in accordance with the preferred embodiment is essentially the same as that shown in FIG. 1. However, the electromagnetic clutch according to the preferred embodiment is outfitted with a rotor having an axial end plate 5d such as that shown in FIG. 4.

Axial end plate 5d according to the preferred embodiment is formed with a plurality of concentric rings 50, 52, 54, three of which are shown in FIG. 4. It is within the purview of the preferred embodiment, however, to have a rotor with only two concentric rings, or a rotor with more than three concentric rings. Concentric rings are defined by a plurality of alternating arcuate slits 5a, 5b, 5c, and ribs 200, 202, 204. For example, inner concentric ring 50 is formed by a plurality of alternating arcuate slits 5a and ribs 200 while middle concentric ring 52 is formed by a plurality of alternating arcuate slits 5b and ribs 202. Outer concentric ring 54 is formed by a plurality of alternating arcuate slits 5c and ribs 204.

The voids created by slits 5a, 5b, 5c establish air gaps which are resistant to the flow of magnetic flux and thus cause magnetic poles to be set up on opposite sides of each slit. For example, six poles are established in axial end plate 5d of FIG. 4. In particular, one magnetic pole face is defined by the annular area located radially inwardly of inner ring 50, two poles are defined by the annular area between inner ring 50 and middle ring 52, two additional poles are defined by the annular area between middle ring 52 and outer ring 54, and the sixth pole is defined by the annular area located outwardly of outer ring 54.

The width of the ribs on each concentric ring are preferably substantially the same as the width of the other ribs on the same concentric ring. For example, all of ribs 200 on inner ring 50 have a width of $W_1$, all of ribs 202 on middle ring 52 have a width of $W_2$, and all of ribs 204 on outer ring 54 have a width of $W_3$. However, there may be, within the purview of the preferred embodiment, some deviation between the widths of the ribs on the same concentric ring. Similarly, the arc lengths of the arcuate slits on each concentric ring are substantially the same as the arc lengths of the other arcuate slits on the same concentric ring. However, there may be, within the purview of the preferred embodiment, some deviation between the arc lengths of the arcuate slits on the same concentric ring. Instead of the maintaining as substantially equal the arc lengths of the arcuate slits and widths of the ribs on the same concentric ring, the important relationships of ribs and arcuate slits is between those on different concentric rings.

For example, in FIG. 4, the widths $W_1$ of ribs 200 on inner concentric ring 50 are designed to be greater than the widths $W_2$ of ribs 202 on middle concentric ring 52. Similarly, the widths $W_2$ of ribs 202 on middle concentric ring 52 are designed to be greater than the widths $W_3$ of ribs 204 on outer concentric ring 54. These different widths account for the different bending stresses experienced along the radius of axial end plate $5d$. In particular, since ribs 200 of inner concentric ring 50 are the furthest from the application of the load of the belt, they experience the largest bending stress. Consequently, ribs 200 of inner concentric ring 50 require the largest width. On the other hand, ribs 204 of outer concentric ring 54 are the closest to the application of the load of the belt. Consequently, ribs 204 of outer concentric ring 54 require the smallest width. By having the widths of the ribs progressively larger towards the radial center of axial end plate $5d$, the bending stress is more evenly distributed along the radius of axial end plate $5d$.

Figure 5:
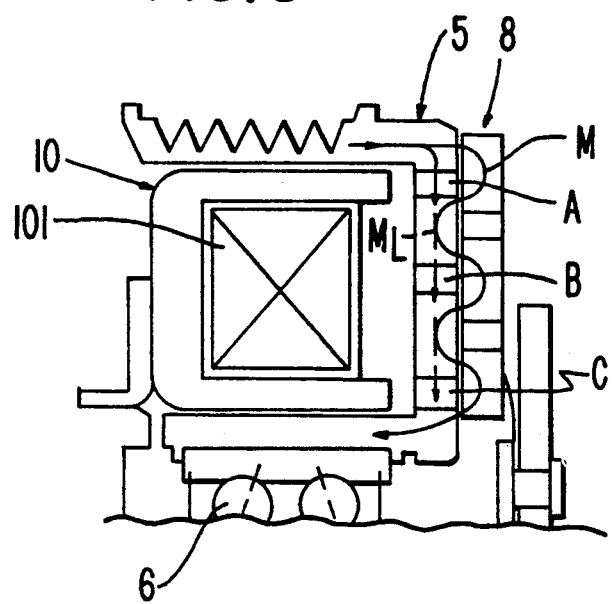
FIG. 5 is a partial cross-sectional view of an electromagnetic clutch showing the electromagnetic flux therethrough.

Additionally, none of ribs 200 on inner concentric ring 50 are aligned radially with ribs 202 on middle concentric ring 52, and none of ribs 202 on middle concentric ring 52 are aligned radially with ribs 204 on outer concentric ring 54. Thus, the magnetic flux is forced to follow a zigzagging path between slits $5a$, $5b$, $5c$ on axial end plate $5d$ and slits $8a$, $8b$ on armature plate 8. Since, by not aligning the ribs radially, the magnetic flux leakage through the ribs has been reduced, the attractive force of the electromagnetic clutch has been increased. For example, Table 1, when read in conjunction with FIG. 5, shows the volume of the magnetic flux that leaks when the axial end plate is designed with all of the ribs radially aligned versus the volume of magnetic flux that leaks when the axial end plate is designed according to the preferred embodiment. In FIG. 5, leakage flux $M_L$ is designated by the dotted line while the main flux M is designated by the solid line.

TABLE 1

| Position | Prior Art | Preferred Embodiment |
|----------|-----------|----------------------|
| A | 22.7% | 17.6% |
| B | 28.3% | 10.6% |
| C | 21.0% | 17.6% |

Thus, at position A, the flux that leaks (i.e., does not contribute to the attraction between the rotor and armature plate) according to the prior art axial end plate design is on the order of 22.7% of the total magnetic flux while the preferred embodiment only has a 17.6% leakage of magnetic flux (a reduction by 5.1% over the prior art). At position B, the flux that leaks according to the prior art axial end plate design is on the order of 28.3% of the original magnetic flux while the preferred embodiment only has a 10.6% leakage (a reduction by 17.7% over the prior art). Finally, at point C, the flux that leaks according to the prior art axial end plate design is on the order of 21.0% of the original magnetic flux while the preferred embodiment only has a 17.6% leakage (a reduction by 3.4% over the prior art).

In the particular axial end plate of FIG. 4, inner concentric ring 50 has more ribs and arcuate slits than middle concentric ring 52 or outer concentric ring 54. However, so long as none of ribs 200 of inner concentric ring 50 are aligned radially with ribs 202 of middle concentric ring 52, and so long as ribs 200 of inner concentric ring are wider than ribs of middle concentric ring 52, inner concentric ring 50 and middle concentric ring 52 may be manufactured with the same number of ribs. This is illustrated by the relationship between middle concentric ring 52 and outer concentric ring 54. In particular, middle concentric ring 52 and outer concentric ring 54 have the same number of ribs. However, none of ribs 202 of middle concentric ring 52 are aligned radially with ribs 204 of outer concentric ring 54, and ribs 202 on middle concentric ring 52 are wider than ribs 204 on outer concentric ring 54.

By designing axial end plate $5d$ with the appropriate number of ribs on each concentric ring so as to maintain the relationships of the equations defined in the Background of the Invention, an axial end plate according to the preferred embodiment is manufactured with angle $\theta_1$ between the center of adjacent ribs 200 on inner concentric ring 50 smaller than angle $\theta_3$ between the center of ribs 204 on outer concentric ring 54. In the preferred embodiment, angle $\theta_2$ between the centers of ribs 202 on middle concentric ring 52 is the same as angle $\theta_3$ between the centers of ribs 204 on outer concentric ring 54. It is in the purview of the instant invention, however, to have five slits $5b$ on middle concentric ring 52 instead of the four slits $5d$ shown in FIG. 4. In that case, angle $\theta_2$ between the centers of ribs 202 on middle concentric ring 52 would be less than angle $\theta_3$ between the centers of ribs 204 on outer concentric ring 54. It will be apparent that the angle between the centers of the ribs on any given concentric ring are equal to or less than the angle between the centers of the ribs on any adjacent outer concentric ring. This relationship assures that the bending stresses are evenly distributed across the radius of the axial end plate.

This invention has been described in detail in connection with the preferred embodiment, but this is an example only and the invention is not restricted thereto. It will be easily understood by those skilled in the art that other variations and modifications can be easily made within the scope of the preferred embodiment.

I claim:

1. In an electromagnetic clutch having a first rotatable member supported on a first bearing, said first rotatable member having an axial end plate of magnetic material, said end plate being provided with a plurality of concentric slits disposed on at least two rings thereby defining at least a first radially inner concentric ring and a second radially outer concentric ring, a plurality of magnetic poles defined by said concentric rings, a second rotatable member rotatably supported on a second bearing, a cooperating annular armature plate of magnetic material coupled to said second rotatable member so as to be capable of limited axial movement, said annular armature plate facing said axial end plate of said first rotatable member with an axial gap therebetween, and electromagnetic means associated with said axial end plate for attracting said armature plate such that rotational force may be transmitted to said second rotatable member, the improvement comprising:

ribs disposed between adjacent slits on each concentric ring, wherein the width of said ribs of said first concentric ring are greater than the width of said ribs of said second concentric ring; and a third concentric ring on said axial end plate at a position radially outside of and concentric with said second concentric ring, said third concentric ring having slits and ribs alternating therearound, said ribs of said third concentric ring have a width less than said ribs of said second concentric ring;

wherein an angle between the center of adjacent ribs on said first concentric ring is less than an angle between the center of adjacent ribs on at least one of said second and third concentric rings.

2. In an electromagnetic clutch having a first rotatable member supported on a first bearing, said first rotatable member having an axial plate of magnetic material, said end plate being provided with a plurality of concentric slits disposed on at least two rings thereby defining at least a first radially inner concentric ring and a second radially outer concentric ring, a plurality of magnetic poles defined by said concentric rings, a second rotatable member rotatably supported on a second bearing, a cooperating annular armature plate of magnetic material coupled to said second rotatable member so as to be capable of limited axial movement, said annular armature plate facing said axial end plate of said first rotatable member with an axial gap therebetween, and electromagnetic means associated with said axial end plate for attracting said armature plate such that rotational force may be transmitted to said second rotatable member, the improvement comprising:

ribs disposed between adjacent slits on each concentric ring, wherein the width of said ribs of said first concentric ring are greater than the width of said ribs of said second concentric ring, and wherein said first concentric ring has more ribs than said second concentric ring.

3. In an electromagnetic clutch having a first rotatable member supported on a first bearing, said first rotatable member having an axial end plate of magnetic material, said end plate being provided with a plurality of concentric slits disposed on at least two rings thereby defining at least a first radially inner concentric ring and a second radially outer concentric ring, a plurality of magnetic poles defined by said concentric rings, a second rotatable member rotatably supported on a second bearing, a cooperating annular armature plate of magnetic material coupled to said second rotatable member so as to be capable of limited axial movement, said annular armature plate facing said axial end plate of said first rotatable member with an axial gap therebetween, and electromagnetic means associated with said axial end plate for attracting said armature plate such that rotational force may be transmitted to said second rotatable member, the improvement comprising:

ribs disposed between adjacent slits on each concentric ring; wherein the width of said ribs of said first concentric ring are greater than the width of said ribs of said second concentric ring, and wherein an angle between the center of adjacent ribs on said first concentric ring is less than an angle between the center of adjacent ribs on said second concentric ring.

4. An electromagnetic clutch comprising:

a first rotatable member having an axial end plate of magnetic material, a first concentric ring formed in said axial end plate, a second concentric ring formed in said axial end plate and disposed radially outside and concentric with said first concentric ring, said first and second concentric rings formed by alternating slits and ribs, wherein the width of said ribs of said first concentric ring are greater than the width of said ribs of said second concentric ring;

a plurality of magnetic poles defined by said concentric rings;

a second rotatable member;

an annular armature plate of magnetic material coupled to said second rotatable member so as to be capable of limited axial movement, said armature plate facing said axial end plate with an axial gap therebetween; and an electromagnetic means associated with said axial end plate for attracting said armature plate such that rotational force may be transmitted to said second rotatable member, wherein an angle between the center of adjacent ribs on said first concentric ring is less than an angle between the center of adjacent ribs on said second concentric ring.

5. An electromagnetic clutch comprising:

a first rotatable member having an axial end plate of magnetic material;

a first concentric ring formed in said axial end plate;

a second concentric ring formed in said axial end plate and disposed radially outside and concentric with said first concentric ring, said first and second concentric rings formed by alternating slits and ribs, wherein an angle between the center of adjacent ribs on said first concentric ring is less than an angle between the center of adjacent ribs on said second concentric ring;

a plurality of magnetic poles defined by said concentric rings;

a second rotatable member;

an annular armature plate of magnetic material coupled to said second rotatable member so as to be capable of limited axial movement, said armature plate facing said axial end plate with an axial gap therebetween; and an electromagnetic means associated with said axial end plate for attracting said armature plate such that rotational force may be transmitted to said second rotatable member;

wherein said axial end plate further comprises a third concentric ring radially outside and concentric with said second concentric ring, said third concentric ring having slits and ribs alternating therearound.

6. The electromagnetic clutch as defined in claim 5 wherein an angle between the center of adjacent ribs on said second concentric ring is less than or equal to an angle between the center of adjacent ribs on said third concentric ring.

* * * * *